(12) United States Patent
Tinnakornsrisuphap et al.

(10) Patent No.: US 9,913,239 B2
(45) Date of Patent: Mar. 6, 2018

(54) METHOD AND SYSTEM FOR DETERMINING LOCATION OF MOBILE DEVICES IN A FEMTOCELL

(71) Applicant: QUALCOMM Incorporated, San Diego, CA (US)

(72) Inventors: Peerapol Tinnakornsrisuphap, San Diego, CA (US); Damanjit Singh, San Diego, CA (US); Andrei Dragos Radulescu, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 13/787,750

(22) Filed: Mar. 6, 2013

(65) Prior Publication Data

US 2013/0237245 A1  Sep. 12, 2013

Related U.S. Application Data

(60) Provisional application No. 61/609,206, filed on Mar. 9, 2012.

(51) Int. Cl.
*H04W 24/00* (2009.01)
*H04W 64/00* (2009.01)
(Continued)

(52) U.S. Cl.
CPC .......... *H04W 64/00* (2013.01); *H04W 24/02* (2013.01); *H04W 84/045* (2013.01)

(58) Field of Classification Search
CPC ... H04W 24/10; H04W 72/042; H04W 24/08; H04W 36/0083; H04W 52/08;
(Continued)

(56) References Cited

U.S. PATENT DOCUMENTS 9,313,720 B2   4/2016 Balasubramanian et al.
2007/0270151 A1* 11/2007 Claussen et al. ............. 455/444
(Continued)

FOREIGN PATENT DOCUMENTS

CN    101449606 A    6/2009
CN    101800992 A    8/2010
(Continued)

OTHER PUBLICATIONS

International Search Report and Written Opinion—PCT/US2013/030028—ISA/EPO—dated May 7, 2013.

*Primary Examiner* — Kwasi Karikari
(74) *Attorney, Agent, or Firm* — Arent Fox LLP

(57) ABSTRACT

Disclosed are system and method for classifying location of a mobile device in a femtocell. In an aspect, the system and method are configured to receive, by a femtocell, location measurement information and performance measurement reports from a mobile device; classify location of the mobile device as indoors or outdoors based on the received location measurement information; and adjust a coverage area, transmit power, and/or radio frequency (RF) channel/band of the femtocell based on the location classification of the mobile device and performance measurements reports.

34 Claims, 11 Drawing Sheets

(51) Int. Cl.
*H04W 24/02* (2009.01)
*H04W 84/04* (2009.01)

(58) Field of Classification Search
CPC ............ H04W 52/242; H04W 52/243; H04W
52/244; H04W 52/325; H04W 28/08;
H04W 52/146; H04W 52/241; H04W
52/245; H04W 52/34
See application file for complete search history.

(56) References Cited

U.S. PATENT DOCUMENTS

| | | |
|---|---|---|
| 2008/0146153 A1 | 6/2008 | Grosspietsch et al. |
| 2009/0253421 A1 | 10/2009 | Camp, Jr. et al. |
| 2010/0187406 A1 | 7/2010 | Van Dalen et al. |
| 2010/0278141 A1 | 11/2010 | Choi-Grogan et al. |
| 2011/0177806 A1 | 7/2011 | Kazmi et al. |
| 2012/0028629 A1* | 2/2012 | Liu et al. .................. 455/422.1 |
| 2012/0252521 A1 | 10/2012 | Nagaraja et al. |
| 2012/0270566 A1* | 10/2012 | Persson ..................... 455/456.3 |
| 2013/0157638 A1* | 6/2013 | Malmbak ............. H04W 4/001 455/418 |

FOREIGN PATENT DOCUMENTS

| | | |
|---|---|---|
| EP | 2200352 A1 | 6/2010 |
| EP | 2 259 638 A1 | 12/2010 |
| EP | 2418898 A2 | 2/2012 |
| EP | 2 523 496 A1 | 11/2012 |
| JP | 2004-061464 A | 2/2004 |
| WO | WO-2009/119212 A1 | 10/2009 |
| WO | WO-2009/120902 A1 | 10/2009 |
| WO | WO-2011/083801 A1 | 7/2011 |
| WO | 2012145718 A2 | 10/2012 |

* cited by examiner

METHOD AND SYSTEM FOR DETERMINING LOCATION OF MOBILE DEVICES IN A FEMTOCELL

CLAIM OF PRIORITY UNDER 35 U.S.C. §119

The present Application for Patent claims priority to Provisional Applications No. 61/609,206 entitled "Apparatus and Method for Determining Location of Mobile Devices in a Femtocell" and filed on Mar. 9, 2012, and assigned to the assignee hereof and hereby expressly incorporated by reference herein.

BACKGROUND

Field

This disclosure relates generally to the field of wireless communications and more specifically to the system and methods for determining indoors or outdoors location of mobile devices in a femtocell.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations (e.g., which can be commonly referred as macro nodes). To supplement conventional base stations, additional low power base stations (e.g., which can be commonly referred as femto nodes cells or pico nodes) can be deployed to provide more robust wireless coverage to mobile devices. For example, low power base stations can be deployed for incremental capacity growth, richer user experience, in-building or other specific geographic coverage, and/or the like.

Femto nodes are often installed by users in their homes, offices, buildings and other indoors environments without consideration of the overall wireless network infrastructure. In a closed access femtocell deployments, a femto node typically targets its coverage indoor and chooses a radio frequency (RF) channel/band where it measures least signal strength from neighboring macrocells and femtocells in order to avoid interference. In an open access femtocell deployments, a femto node may select the same RF channel/band as neighboring femtocells and macrocells to achieve better frequency reuse, but this may lead to interference issues in high density femtocell deployments. Therefore, improvements in the operation of femto nodes are desired.

SUMMARY

The following presents a simplified summary of one or more aspects of systems, methods and computer program products for determining location of a mobile device, such as indoors or outdoors, in a femtocell and adjusting RF parameters of the femtocell based on the location of the mobile device. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

More specifically, disclosed herein are the systems, methods and computer program products for determining whether a mobile device is located indoors or outdoors for the purpose of selecting a transmit power, RF channel and/or band or other parameters of a femtocell to meet coverage, interference and mobility management criteria in an open or close femtocell deployment. Using location information of the mobile device, e.g., whether it is indoors or outdoors, and performance measurement reports of the mobile device, the femtocell can adjust its transmit power, coverage area and RF channel/band selection in order to improve performance of the femtocell.

In one aspect, a method for classifying location of a mobile device includes receiving, by a femtocell, location measurement information and performance measurement reports from the mobile device. The method further includes classifying location of the mobile device as indoors or outdoors based on the received location measurement information. The method further includes adjusting a coverage area, transmit power, and/or radio frequency (RF) channel/band of the femtocell based on the location classification of the mobile device and performance measurements reports.

In another aspect, a femtocell apparatus for classifying location of a mobile device includes an information collection component configured to receive location measurement information and a performance measurement report from a mobile device. The apparatus further includes a location classification component configured to classify location of the mobile device as indoors or outdoors based on the received location measurement information. The apparatus further includes an adjustment component configured to adjust a coverage area, transmit power, and/or radio frequency (RF) channel/band of the femtocell based on the location classification of the mobile device and performance measurements reports.

In another aspect, a femtocell apparatus for classifying location of a mobile device includes means for receiving location measurement information and performance measurement reports from a mobile device. The apparatus further includes means for classifying location of the mobile device as indoors or outdoors based on the received location measurement information. The apparatus further includes means for adjusting a coverage area, transmit power, and/or radio frequency (RF) channel/band of the femtocell based on the location classification of the mobile device and performance measurements reports.

In yet another aspect, a computer program product for classifying location of a mobile device includes a non-transitory computer readable medium comprising code for causing at least one computer in a femtocell to receive location measurement information and performance measurement reports from a mobile device. The computer program product further includes code for causing at least one computer to classify location of the mobile device as indoors or outdoors based on the received location measurement information. The computer program product further includes code for causing at least one computer to adjust a coverage area, transmit power, and/or radio frequency (RF) channel/ band of the femtocell based on the location classification of the mobile device and performance measurements reports.

In another aspect, a method for classifying location of a mobile device includes performing by the mobile device one or more location measurements. The method further includes classifying the location of the mobile device as indoors or outdoors based on the one or more location measurements. The method further includes collecting one or more performance measurements by the mobile device. The method further includes sending location classification information and a performance measurement report containing one or more performance measurements to a femtocell.

In another aspect, an apparatus for classifying location of a mobile device includes a measurement component configured to perform one or more location measurements and performance measurements of the mobile device. The apparatus further includes a location classification component configured to classify location of the mobile device as indoors or outdoors based on the location measurements. The apparatus further includes an information transmission component configured to send location classification information and a performance measurement report containing one or more performance measurements to a femtocell.

In another aspect, an apparatus for classifying location of a mobile device includes means for performing one or more location measurements by the mobile device. The apparatus further includes means for classifying the location of the mobile device as indoors or outdoors based on the one or more location measurements. The apparatus further includes means for collecting one or more performance measurements by the mobile device. The apparatus further includes means for sending location classification information and a performance measurement report containing one or more performance measurements to a femtocell.

In yet another aspect, computer program product for classifying location of a mobile device includes a computer-readable medium comprising code for causing at least one computer to perform one or more location measurements by the mobile device. The computer program product further includes code for causing at least one computer to classify the location of the mobile device as indoors or outdoors based on the one or more location measurements. The computer program product further includes code for causing at least one computer to collect one or more performance measurements by the mobile device. The computer program product further includes code for causing at least one computer to send location classification information and a performance measurement report containing one or more performance measurements to a femtocell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
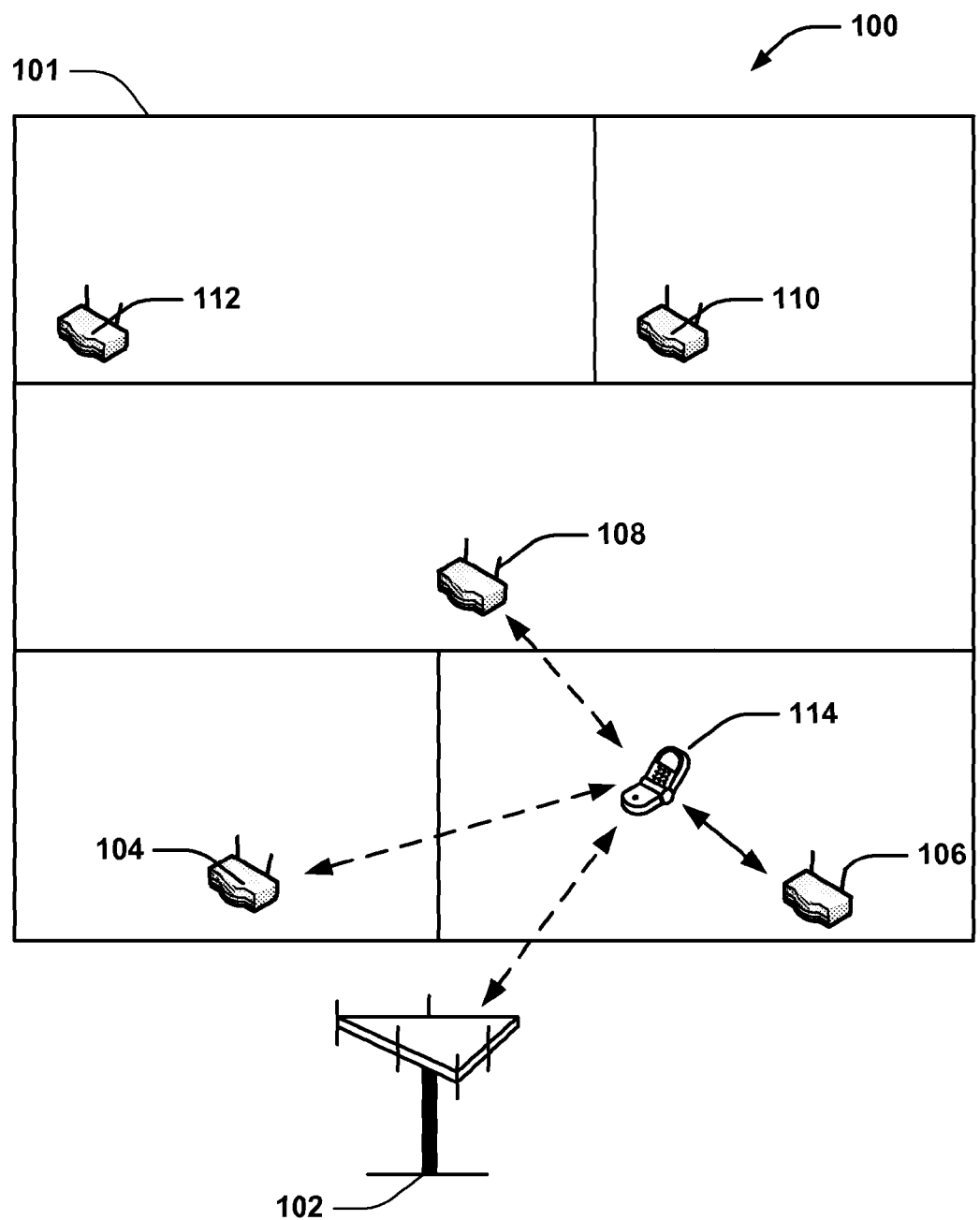
FIG. 1 is a block diagram of an example wireless communication system deployed in a building environment.

In various aspects, systems and methods for determining and classifying location (e.g., outdoors or indoors) of a mobile device in a femtocell. Various aspects will be described with reference to the drawings. In the following description, for purposes of explanation, numerous specific details are set forth in order to provide a thorough understanding of one or more aspects. It may be evident, however, that such aspect(s) may be practiced without these specific details. Furthermore, various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

The wireless communication system(s) may include a plurality of base stations (BS) utilized for communicating with mobile devices(s). These base stations may include a high-power macro node and a low-power femto node. The femto node may also be referred to as a femtocell, an access point, a femto BS, a pico node, a micro node, a Node B, an evolved Node B (eNB), a home Node B (HNB) or home evolved Node B (HeNB), collectively referred to as H(e)NB, or some other terminology. These femto nodes are generally considered to be low-power base stations. For example, a low-power base station transmits at a relatively low power as compared to a macro base station associated with a wireless wide area network (WWAN). As such, the coverage area of the low power femto node (e.g., femtocell) can be substantially smaller than the coverage area of a macro node (e.g., macrocell).

As generally known in the art, a mobile device can also be called a system, device, subscriber unit, subscriber station, mobile station, mobile, remote station, mobile terminal, remote terminal, access terminal, user terminal, terminal, communication device, user agent, user device, or user equipment (UE). A mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected via a wireless modem to one or more BS that provide cellular or wireless network access to the mobile device.

FIG. 1 shows an example wireless communication system 100 deployed in a multi-room building 101. System 100 includes an outside macro base station 102 that can provide one or more mobile devices 114 with access to a wireless network, as well as a plurality of femto nodes 104, 106, 108, 110, and 112 located inside the building, which can also provide wireless network access over a backhaul link with a mobile network over a broadband internet connection. In one example, femto nodes 104, 106, 108, 110, and/or 112 can be other types of low power base stations, a relay node, a device (e.g., communicating in peer-to-peer or ad-hoc mode with other devices), etc. Each femto node forms a femtocell (not shown in FIG. 1, but described in greater detail below with reference in FIG. 9). Moreover, system 100 comprises a plurality of mobile devices, such as device 114, which can be located inside one of the rooms of the building 101. The mobile device 114 may communicate wirelessly with one or more of the femto nodes 104, 106 and/or 108 as well as with the macro base station 102, which provided telecommunication services (e.g., voice, data, etc.) to the mobile device.

In a closed access femtocell deployment, femto node 106 targets its coverage indoor and chooses a RF channel/band where it measures least signal strength from neighboring macrocells and femtocells in order to avoid interference. In an open access femtocell deployment, femto node 106 may select same RF channel as neighboring femtocells and macrocells to achieve better frequency reuse, but this may lead to interference issues in high density femtocell deployments. Instead, it may be more advantageous for femtocells near house edge (e.g., femto node 106) to select one RF channel/band (e.g., lower RF band) and femtocells deep in the house (e.g., femto node 108) to select another RF channel/band (e.g., higher RF band) to minimize inter-frequency interference and improve indoor and outdoor coverage. Thus, according to one aspect, the mobile device 114 or the femtocell 106 may be configured to determine whether mobile device 114 is located inside or outside the premises 101, so that the femtocell 106 can use the information in conjunction with performance measurement reports of the mobile device to improve its coverage area and frequency selection.

Figure 2:
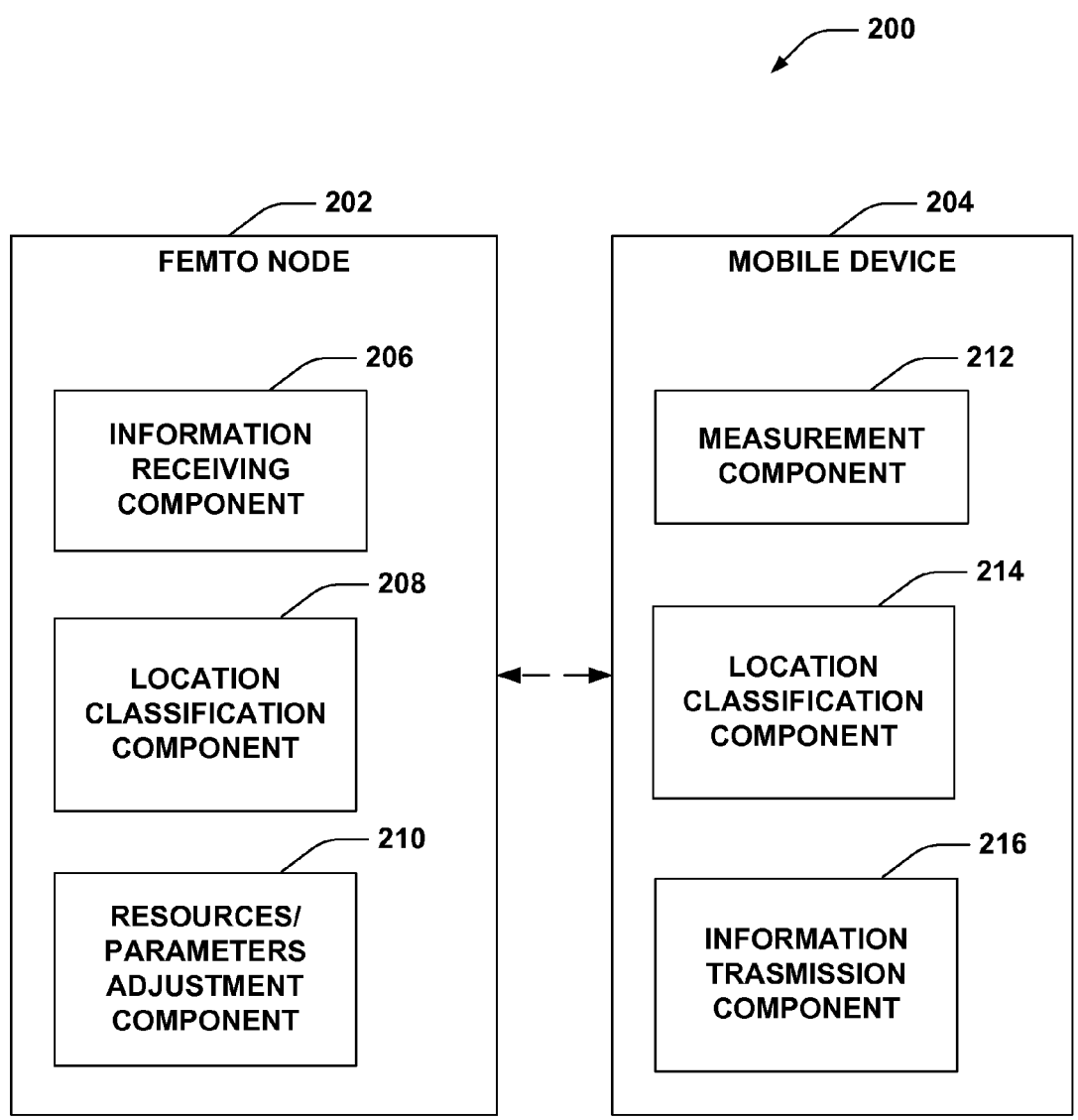
FIG. 2 is a block diagram of an example system for classifying a location of a mobile device according to one aspect.

FIG. 2 illustrates an example communication system 200 that can be used to determine location of a mobile device (e.g., indoors or outdoors), and make appropriate femtocell adjustments based on the location of the mobile device. The system 200 includes a femto node 202 (e.g., any one of femto nodes 104, 106, 108, 110 or 112 of FIG. 1) and a mobile device 204 (e.g., mobile device 114 of FIG. 1). In one aspect, the mobile device 204 includes a measurement component 212 that performs different types of location and performance measurements that can be used to determine location of the mobile device 204. The mobile device 204 also includes a location classification component 214 that uses the measured location parameters to classify the location of the mobile device 204, e.g., as indoors or outdoors. The mobile device 204 also includes a information transmission component 216 that sends to the femto node 202 the location measurement information and/or the location classification information, and performance measurement reports generated by the mobile device.

In one aspect, the measurement component 212 may use acoustic techniques to determine location of the mobile device 204. For example, the measurement component 212 may activate a speaker of the mobile device 204 to emit a predefined sound pattern and activate a microphone of mobile device 204 to detect whether the pattern is received via an echo of the same pattern. Echoes are much more likely to occur indoors than outdoors. The component 212 may also analyze the received echo signal for presence of noise since outdoor areas are generally more noisy than indoors and may include certain types of noise, such as vehicle noises and the like.

In another aspect, the measurement component 212 may use optical techniques to determine location of the mobile device 204. For example, the measurement component 212 may activate a light sensor or camera of the mobile device 204 to detect the level of light intensity and its spectrum components. Natural sunlight has a different frequency spectrum than the artificial light emitted by fluorescent or incandescent lamps, which are usually used indoors. The component 212 may use known spectrum analysis processes to distinguish frequency components of the detected light in order to identify its source. Also, the sunlight during daytime is generally more intense than light from artificial sources, and, conversely, at night, the brighter areas are generally indoors. The component 212 may be further configured to measure the light intensity and correlated it with its clock reading in order to identify the source of the light.

In another aspect, the measurement component 212 may use global positing system (GPS) of the mobile device 204 or other systems, such as GLONASS, to determine the location of the mobile device 204. For example, it is known that GPS signal strength is very strong outdoors, but decreases quickly indoors, 5 to 10 m away from the windows. Thus, GPS signal strength can be used to determine whether the mobile device 204 is indoors or outdoors. For example, the component 212 may measure GPS signal strength (e.g., averaged signal strength over certain time duration) and compare it with a predefined threshold. If the GPS signal strength exceeds the threshold, the mobile device 204 is like outdoors than indoors. GPS signal measurements may also be used to determine the speed of the mobile device 204, which would indicate whether the mobile device 204 is a fast moving vehicular device traveling outdoors.

In another aspect, the measurement component 212 may use altimeter and/or barometer measurements of the mobile device 204 for location determination. For example, the estimated altitude of the mobile device 204 compared to the rough geographical altitude in the area can be used by component 212 to determine whether the mobile device 204 is in a high-rise building or not. The altitude that is much higher than typical in the area can infer that the mobile device 204 is indoors rather than outdoors. The altimeter measurements may be supplemented by barometer measurements, which change with the elevation of the mobile device above sea level.

In another aspect, the measurement component 212 may use accelerometer and/or gyroscope measurements of the mobile device 204 for location determination. For example, certain motion patterns detected by the accelerometer and/or gyroscope can indicate whether the mobile device 204 is inside a moving vehicle (i.e., outdoors) or is carried by a user walking up/down the stairs (i.e., indoors).

In another aspect, the measurement component 212 may use RF channel measurement parameters of the mobile device 204, e.g., multipath noise and Doppler measurements, to determine location of the mobile device 204. For example, the speed with which the mobile device 204 travels correlates to the Doppler spread that the signal from the mobile device 204 can be received. Doppler spread is higher when the mobile device travels faster, which indicates that the mobile device is outdoors. Also, channel noise from multipath interference is generally much higher indoors than outdoors.

In another aspect, the measurement component 212 may use location/travel history of the mobile device 204 to determine the current location of the mobile device 204. For example, the area that is traversed mostly by temporary users is more likely to be an outdoor area. Also, if the location history shows that the mobile device 204 has been frequently switching between femtocells and macrocells, then most like the mobile device 204 is a fast moving vehicular device traveling outdoors, and its current location may be estimated from trajectory of his path and known locations of femto and macrocells to which the mobile device 204 is or has been recently connected.

In yet another aspect, the measurement component 212 may collect performance measurement information, such as key performance indicators (KPIs) of the mobile device 204. For example, performance measurement information may include, but not limited to statistics of services used (e.g., voice, data, streaming) by the mobile device 204, received signal strength indicator (RSSI), service expectations (scheduled system updates or synchronizations, etc.), number of cell reselections, number and type of handovers (e.g., intra-frequency, inter-frequency, inter-RAT, handovers to/from macrocell, handovers to/from femtocells), number of call drops, average uplink and/or downlink interference, and other performance, mobility and service parameters. This information may be send to the femtocell 202 using performance measurement reports.

In one aspect, the location classification component 214 may collect location measurement information from the measurement component 212 and classify the location of the mobile device 204 as indoors or outdoors. For example, the location measurement data provided by the component 212 may include, but not limited to acoustical measurements, optical measurements, GPS measurements, altimeter and/or barometer measurements, accelerometer and/or gyroscope measurements, RF channel measurements, and location history information. The location classification component 214 may combine one or more collected items of information and classify the location of mobile device 204 as indoors or outdoors. For example, if a weak GPS signal indicates that mobile device 204 is indoors and optical measurement shows that the detected light spectrum is characteristic of fluorescent light typically used indoors, then location classification component 214 may classify with great certainty location of the mobile device 204 as indoors. In one aspect, different weighting coefficients can be applied to the different location measurements received from component 212. For example, if a very strong GPS signal indicates with great probability, e.g., 90% or more, that the mobile device 204 is located outdoors, but optical signal measurement given 60% that the mobile device is indoors based on the spectrum analysis of the detected light, then greater weight can be given to the GPS measurement than optical measurement when all measurements are combined, and the components 212 may classify the location of the mobile device 204 as outdoors.

In one aspect, the information transmission component 216 of the mobile device 204 is configured to collect either location measurement information from the measurement component 212 or location classification data from location classification component 214 and send it over the air to the femto node 202 via air-interface messages or via application-level messages. In addition, the information transmission component 216 may send to the femto node 202 a performance measurement report including KPI information. In one aspect, the information transmission component 216 can time-stamp the location measurement or classification data send to the femto node 202, so it can be time-correlated to the performance measurement reports sent by component 216.

In one aspect, the femto node 202 includes a location information receiving component 206, a location classification component 208 and resources/parameters adjustment component 210. The component 206 is configured to receive over the air one or more of the location measurement parameters or the location classification information from mobile device 204, as well performance measurement reports from mobile devices 204. If the femto node 202 receives only location measurement information, the femto node may pass it to the location classification component 208 for performing classification of the location of the mobile device 204. For example, the location measurement data provided by the mobile device 204 may include, but not limited to acoustical measurements, optical measurements, GPS measurements, altimeter and/or barometer measurements, accelerometer and/or gyroscope measurements, RF channel measurements, and location/travel history information. The location classification component 208 may combine one or more collected items of information and classify the location of mobile device 204 as indoors or outdoors. For example, if a weak GPS signal indicates that mobile device 204 is indoors and optical measurement shows that the detected light spectrum is characteristic of fluorescent light typically used indoors, then location classification component 208 may classify with great certainty location of the mobile device 204 as indoors. In one aspect, different weighting coefficients can be applied to the different location measurements received from component 212. For example, if a very strong GPS signal indicates with great probability, e.g., 90% or more, that the mobile device 204 is located outdoors, but optical signal measurement given 60% that the mobile device is indoors based on the spectrum analysis of the detected light, then greater weight can be given to the GPS measurement than optical measurement when all measurements are combined, and the components 208 may classify the location of the mobile device 204 as outdoors.

In one aspect, the resource/parameter adjustment component 210 may use the location classification information of the mobile device 204 along with performance measurement reports from the mobile device 204 and/or other mobile device to adjust coverage and/or channel assignment of the femto node 204 in order to improve femtocell coverage area and avoid interference with neighbor femtocells and macrocells. For example, based on the location classification information, the component 210 may determines whether femtocell 204 primarily servers mobile devices 204 located indoors or outdoors. From the performance measurement reports, the component 210 may determines if there is intra-frequency interference with adjacent femtocells and macrocells. Having analyzed this information, the component 210 may adjust coverage and/or channel assignment of the femto node 204 in order to improve femtocell coverage area and avoid interference with neighbor cells. For example, the femtocell 204 that primarily serves mobile devices located indoors may decrease its coverage area, so it does not cover the area outside of the building, which may have many high-speed mobile devices, which will attempt to reselect to the femtocell 204 every time they enter into coverage area of the femtocell, which may overload RF and processing resources of the femto node 204 and create unnecessary network traffic. In another example, femto node 204 that serves mobile devices located outdoors can select one RF channel/band (e.g., lower RF band) and adjacent femtocells located indoors may select a different RF channel/band (e.g., higher RF band) to prevent intra-frequency interference between adjacent femtocells and improve indoor and outdoor coverage. Other optimization techniques known to those of ordinary skill in the art may be used.

Figure 3:
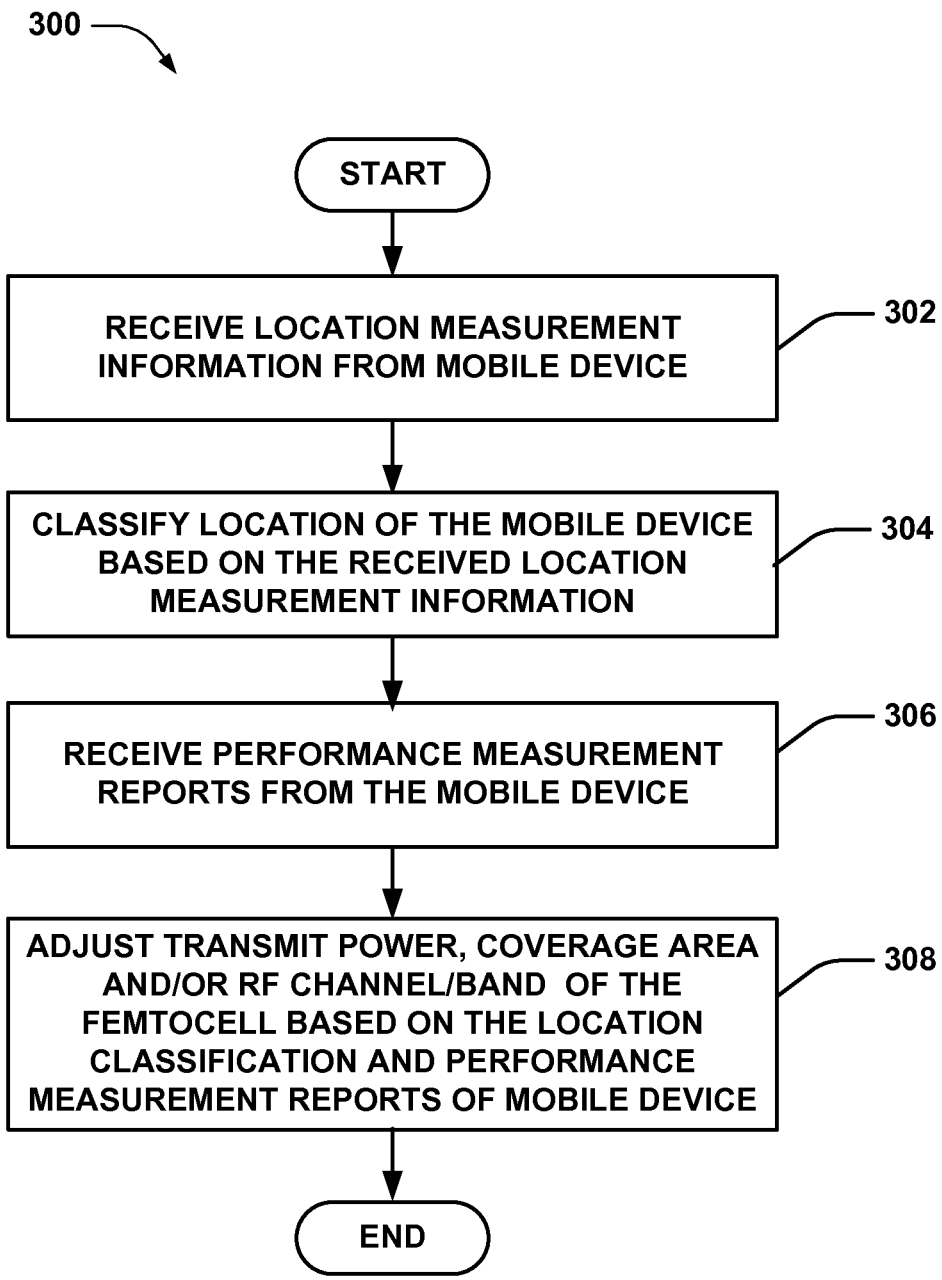
FIG. 3 is a flow diagram of an example methodology for classifying a location of a mobile device according to one aspect.
Figure 4:
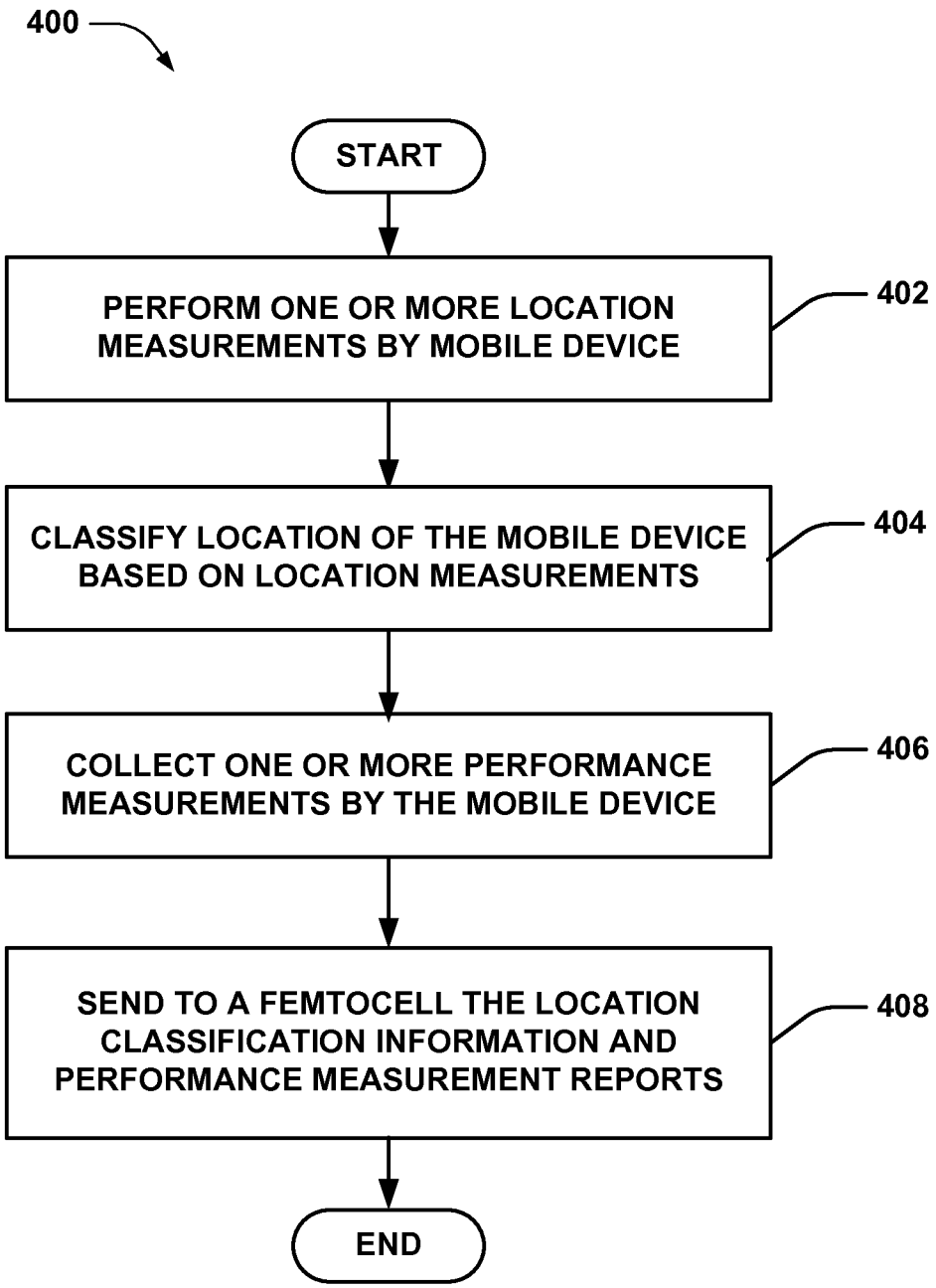
FIG. 4 is a flow diagram of another example methodology for classifying a location of a mobile device according to another aspect.

FIGS. 3 and 4 show example methodologies for classifying location of mobile devices in a femtocell. The example methodology 300 may be defined in instructions stored on a femto node, such as femto node 202 in FIG. 2, or one or more components thereof, and executed by a processor to perform the described acts. The example methodology 400 may be defined in instructions stored on a mobile device such as mobile device 204 in FIG. 2, or one or more components thereof, and executed by a processor to perform the described acts. While, for purposes of simplicity of explanation, the methodologies are shown and described as a series of acts, it is to be understood and appreciated that these methodologies is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 3, at step 302, method 300 includes receiving from a mobile device location measurement information, such as acoustical measurements, optical measurements, GPS measurements, altimeter and/or barometer measurements, accelerometer and/or gyroscope measurements, RF channel measurements, and location history information. For example, in an aspect, the femto node 202 may include location information receiving component 206 that receives the aforementioned location measurement information from the mobile device 204. At step 304, method 300 includes classifying location of the mobile device as indoors or outdoors based on the received location measurement information. For example, in an aspect, the femto node 202 may include location classification component 208 that classifies location of the mobile device 202. At step 306, the method 300 includes receiving performance measurement reports from the mobile device. In one aspect, the performance measurement reports may include various key performance indicators (KPIs), such as statistics on mobile services used, RSSI, the number of cell reselections, number and type of handovers, number of call drops, average UL/DL interference, and other performance, mobility and service parameters. For example, in one aspect, the femto node 202 may include component 206 that receives the aforementioned performance measurement reports from the mobile device 204. At step 308, the method 300 includes adjusting coverage area of the femtocell and/or RF channel/band for the mobile device based on the location classification of the mobile device, performance measurement reports and/or other criteria in order to improve coverage area of the femtocell and avoid interference with neighbor femtocells and macrocells. For example, in one aspect, the femto node 202 may include resource/parameter adjustment component 210 that performs the aforementioned parameter adjustments.

Turning to FIG. 4, at step 402, method 400 includes performing one or more location measurements by the mobile device. For example, in an aspect, the mobile device 204 may include a measurement component 212 configured to perform acoustical measurements, optical measurements, GPS measurements, altimeter and/or barometer measurements, accelerometer and/or gyroscope measurements, RF channel measurements, as well as collect location history information of the mobile device. At step 404, the method 400 includes classifying location of the mobile device based on one or more location measurements. In one aspect, the mobile device 204 may include a location classification component 214 configured to classify location of the mobile device 204 as indoors or outdoors based on the location measurements. At step 406, the method 400 includes collecting one or more performance measurements by the mobile device. In one aspect, the measurement component 212 of the mobile device 204 may be configured to collect various performance measurements, such as PKIs, of the mobile device 204. At step 408, the method 400 includes sending to a femtocell the location classification information and performance measurement report(s) of the mobile device. In one aspect, the mobile device 204 may include information transmission component 216 configured to send the aforementioned information to the femtocell.

Figure 5A:
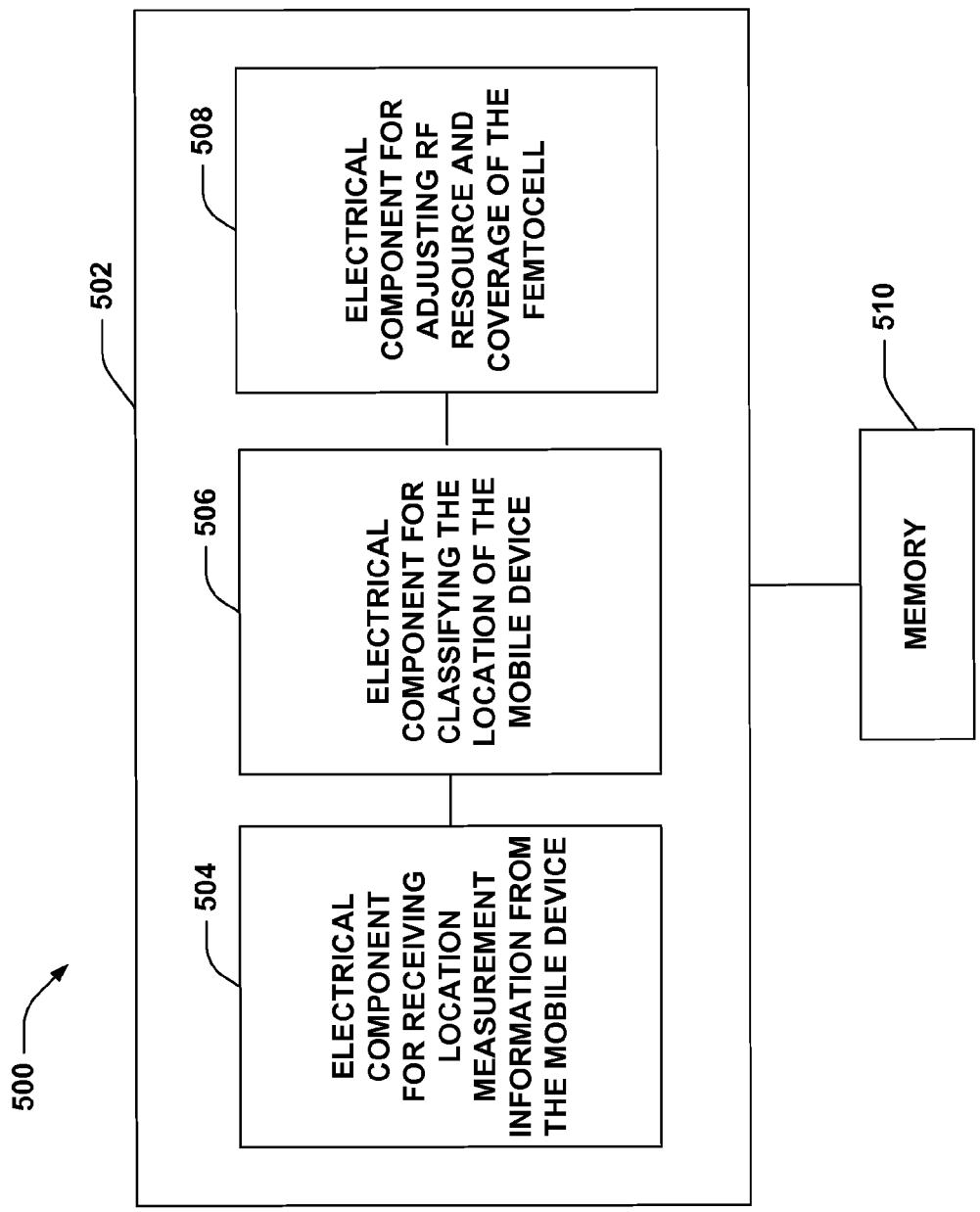
FIG. 5A is a block diagram of an example femto node-based system for classifying a location of a mobile device according to one aspect.

FIG. 5A illustrates one aspect of a femto node-based system for classifying location of a mobile device in a femtocell. For example, the system 500 can reside at least partially within a femto node, such as femto node 202 of FIG. 2. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, in one aspect, logical grouping 502 can include an electrical component 504 for receiving location measurement information and performance measurement reports from mobile devices. In addition, logical grouping 502 can include an electrical component 506 for classifying location of the mobile device as being indoors or outdoors based on the received location measurement information. Furthermore, logical grouping 502 can include an electrical component 508 for adjusting RF resource allocation and coverage area of the femtocell based on location classification of the mobile device and performance measurement reports.

Additionally, system 500 can include a memory 510 that retains instructions for executing functions associated with the electrical components 504, 506 and 508. While shown as being external to memory 510, it is to be understood that one or more of the electrical components 504, 506 and 508 can exist within memory 510. In one example, electrical components 504, 506 and 508 can comprise at least one processor, or each electrical component 504, 506 and 508 can be a corresponding module of at least one processor. Moreover, in an additional or alternative example, electrical components 504, 506 and 508 can be a computer program product comprising a computer readable medium, where each electrical component 504, 506 and 508 can be corresponding code.

Figure 5B:
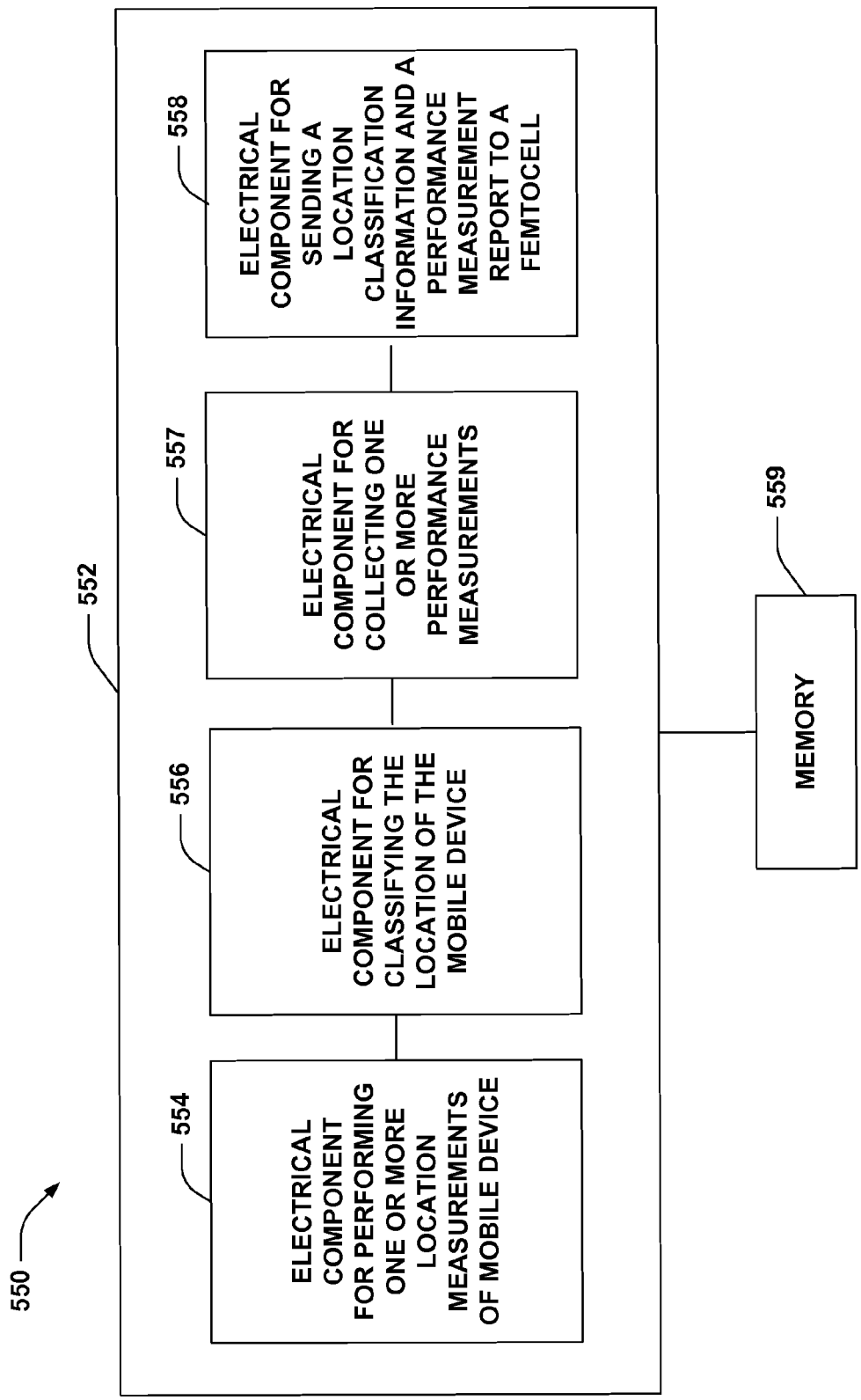
FIG. 5B is a block diagram of an example mobile device-based system for classifying a location of the mobile device according to one aspect.

FIG. 5B illustrates one aspect of a mobile device-based system for classifying location of a mobile device in a femtocell. For example, the system 550 can reside at least partially within a mobile device, such as mobile device 204 of FIG. 2. It is to be appreciated that system 550 is represented as including functional blocks, which can be functional blocks that represent functions implemented by a processor, software, or combination thereof (e.g., firmware). System 550 includes a logical grouping 552 of electrical components that can act in conjunction. For instance, in one aspect, logical grouping 552 can include an electrical component 554 for performing one or more location measurements by a mobile device. In addition, logical grouping 552 can include an electrical component 556 for classifying location of the mobile device as being indoors or outdoors based on location measurements. In addition, logical grouping 552 can include an electrical component 557 for collecting one or more performance measurements by the mobile device. Furthermore, logical grouping 552 can include an electrical component 558 for sending location classification information and a performance measurement report of the mobile device to a femtocell.

Additionally, system 550 can include a memory 559 that retains instructions for executing functions associated with the electrical components 554, 556, 557 and 558. While shown as being external to memory 559, it is to be understood that one or more of the electrical components 554, 556, 557 and 558 can exist within memory 559. In one example, electrical components 554, 556, 557 and 558 can comprise at least one processor, or each electrical component 554, 556, 557 and 558 can be a corresponding module of at least one processor. Moreover, in an additional or alternative example, electrical components 554, 556, 557 and 558 can be a computer program product comprising a computer readable medium, where each electrical component 554, 556, 557 and 558 can be corresponding code.

Figure 6:
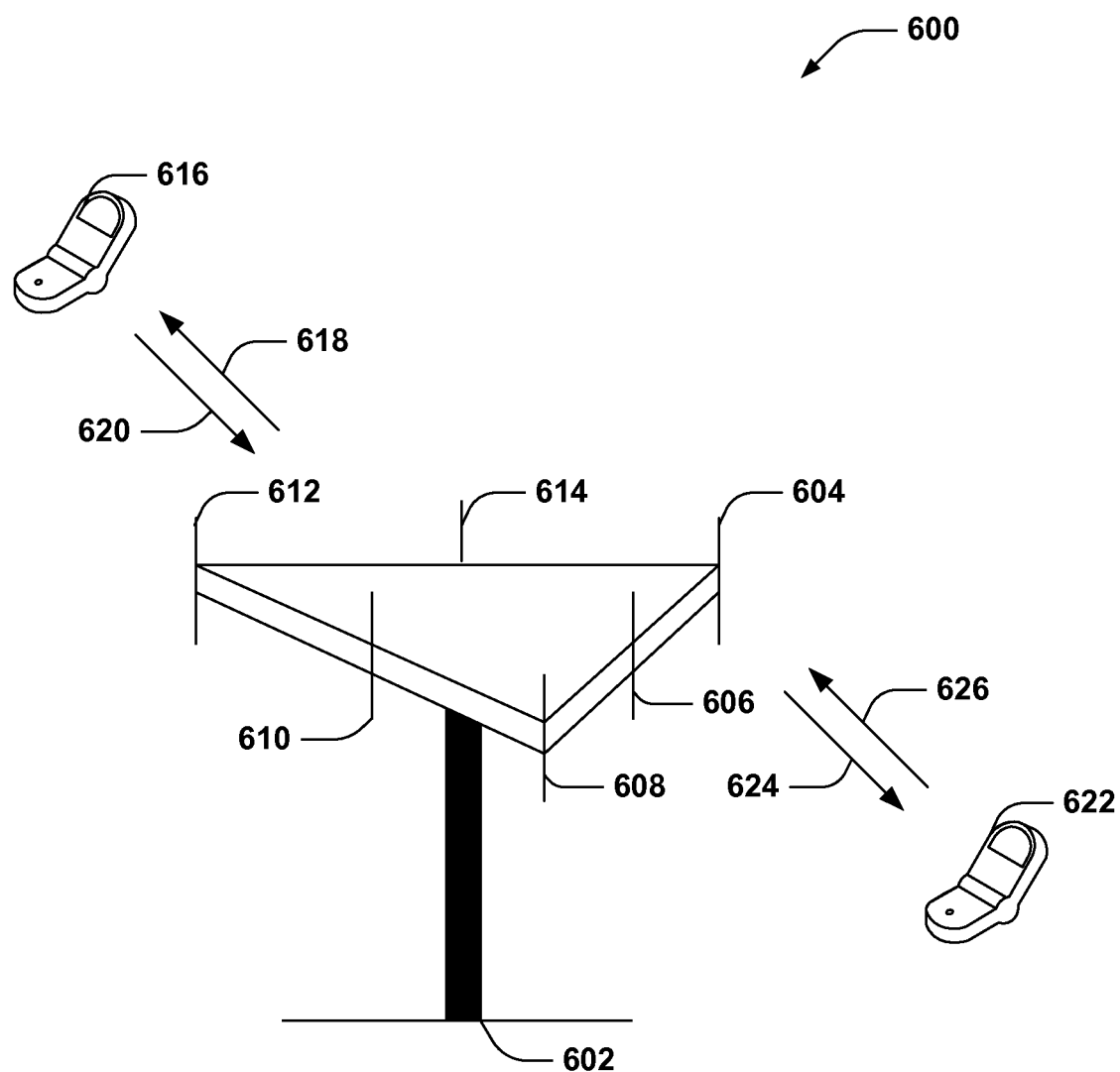
FIG. 6 is a block diagram of an example wireless communication system in accordance with various aspects set forth herein.

Referring now to FIG. 6, a wireless communication system 600 in which systems and methods for classifying location of a mobile device in a femtocell can be implemented. System 600 comprises a base station 602, which may be a femto node, such as femto nodes 202 of FIG. 2 or system 500 of FIG. 5, and may include the components and implement the functions described above with respect to FIGS. 1-5. In one aspect, base station 602 can include multiple antenna groups. For example, one antenna group can include antennas 604 and 606, another group can comprise antennas 608 and 610, and an additional group can include antennas 612 and 614. Two antennas are illustrated for each antenna group; however, more or fewer antennas can be utilized for each group. Base station 602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 602 can communicate with one or more mobile devices such as mobile device 616 and mobile device 622, which can include mobile device 204 of FIG. 2; however, it is to be appreciated that base station 602 can communicate with substantially any number of mobile devices similar to mobile devices 616 and 622. Mobile devices 616 and 622 can be, for example, cellular phones, smart phones, laptops, handheld communication devices, handheld computing devices, satellite radios, global positioning systems, PDAs, and/or any other suitable device for communicating over wireless communication system 600. As depicted, mobile device 616 is in communication with antennas 612 and 614, where antennas 612 and 614 transmit information to mobile device 616 over a forward link 618 and receive information from mobile device 616 over a reverse link 620. Moreover, mobile device 622 is in communication with antennas 604 and 606, where antennas 604 and 606 transmit information to mobile device 622 over a forward link 624 and receive information from mobile device 622 over a reverse link 626. In a frequency division duplex (FDD) system, forward link 618 can utilize a different frequency band than that used by reverse link 620, and forward link 624 can employ a different frequency band than that employed by reverse link 626, for example. Further, in a time division duplex (TDD) system, forward link 618 and reverse link 620 can utilize a common frequency band and forward link 624 and reverse link 626 can utilize a common frequency band.

Each group of antennas and/or the area in which they are designated to communicate can be referred to as a sector of base station 602. For example, antenna groups can be designed to communicate to mobile devices in a sector of the areas covered by base station 602. In communication over forward links 618 and 624, the transmitting antennas of base station 602 can utilize beamforming to improve signal-to-noise ratio of forward links 618 and 624 for mobile devices 616 and 622. Also, while base station 602 utilizes beamforming to transmit to mobile devices 616 and 622 scattered randomly through an associated coverage, mobile devices in neighboring cells can be subject to less interference as compared to a base station transmitting through a single antenna to all its mobile devices. Moreover, mobile devices 616 and 622 can communicate directly with one another using a peer-to-peer or ad hoc technology as depicted. According to an example, system 600 can be a multiple-input multiple-output (MIMO) communication system.

Figure 7:
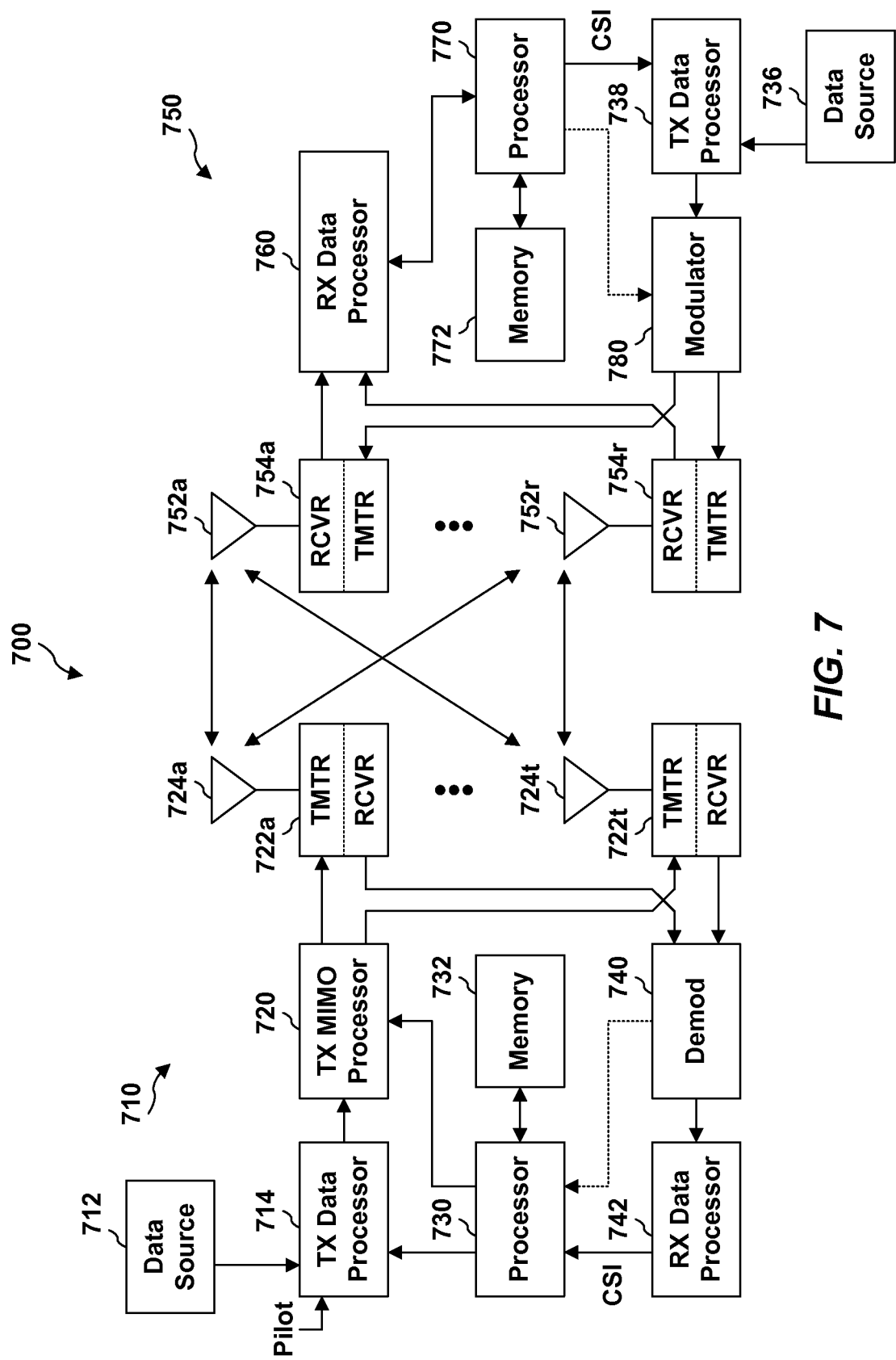
FIG. 7 is an illustration of an example wireless network environment that can be employed in conjunction with the various systems and methods described herein.

FIG. 7 shows an example wireless communication system 700 in which systems and methods for classifying location of a mobile device in a femtocell can be implemented. The wireless communication system 700 depicts one base station 710, which can include a femto node, such as femto node 202 of FIG. 2, and one mobile device 750, such as mobile device 204 of FIG. 2. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1, 2, 5 and 6) and/or methods (FIGS. 3 and 4) described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more femto nodes.

Figure 8:
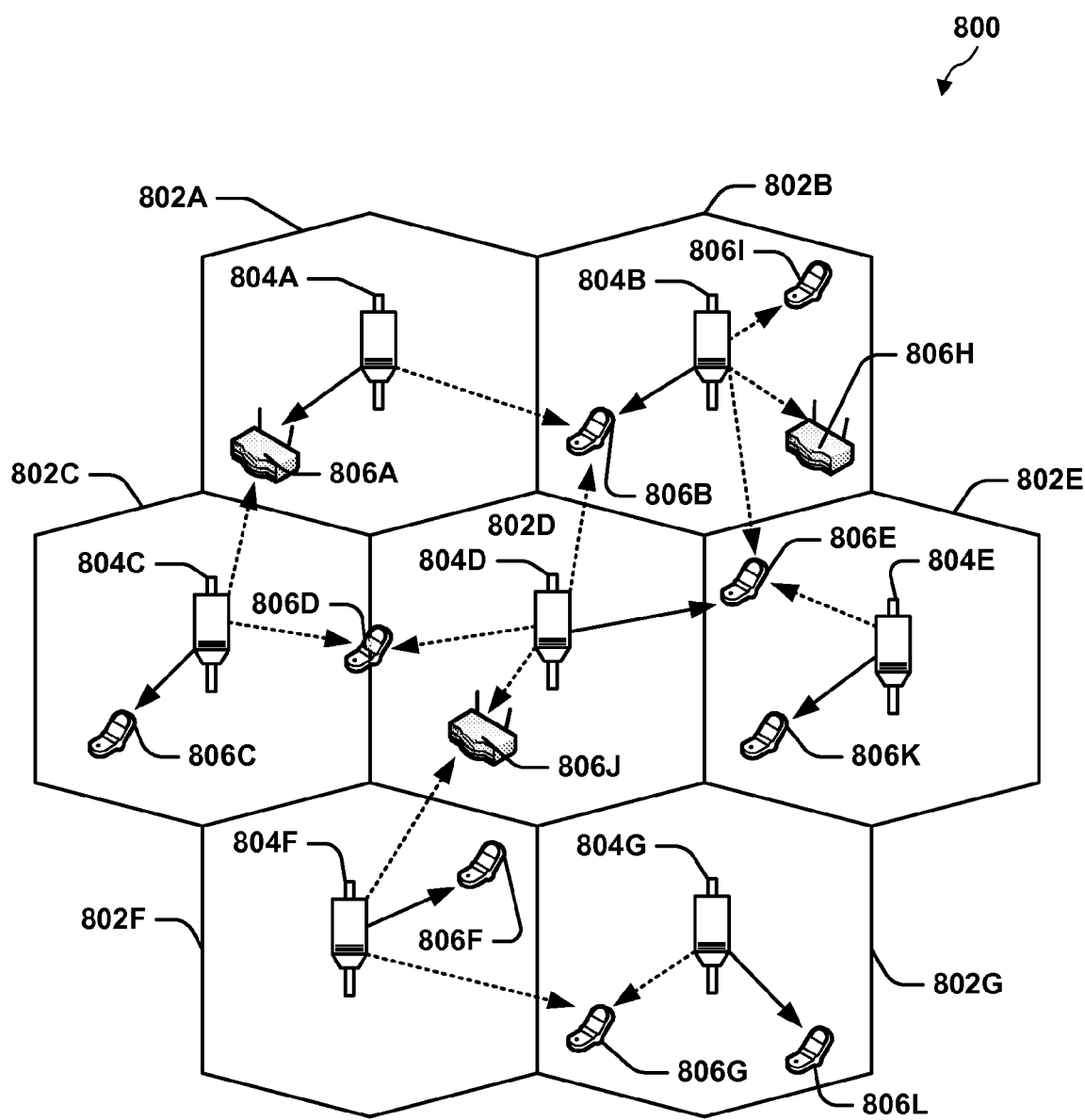
FIG. 8 illustrates an example wireless communication system, configured to support a number of devices, in which the aspects herein can be implemented.

FIG. 8 illustrates a wireless communication system 800, configured to support a number of users, in which systems and methods for classifying location of a mobile device in a femtocell can be implemented. The system 800 provides communication for multiple cells 802, such as, for example, macro cells 802A-802G, with each cell being serviced by a corresponding access node 804 (e.g., access nodes 804A-804G). As shown in FIG. 8, mobile devices 806 (e.g., mobile devices 806A-806L) can be dispersed at various locations throughout the system over time. Each mobile device 806 can communicate with one or more access nodes 804 on a forward link (FL) and/or a reverse link (RL) at a given moment, depending upon whether the mobile device 806 is active and whether it is in soft handoff, for example. The wireless communication system 800 can provide service over a large geographic region. In some aspects, some of the mobile devices 806, such as devices 806A, 806H, and 806J, may be femto nodes, such as nodes 102 or 202 or system 500, and may include the components and implement the functions described above with respect to FIGS. 1-5.

Figure 9:
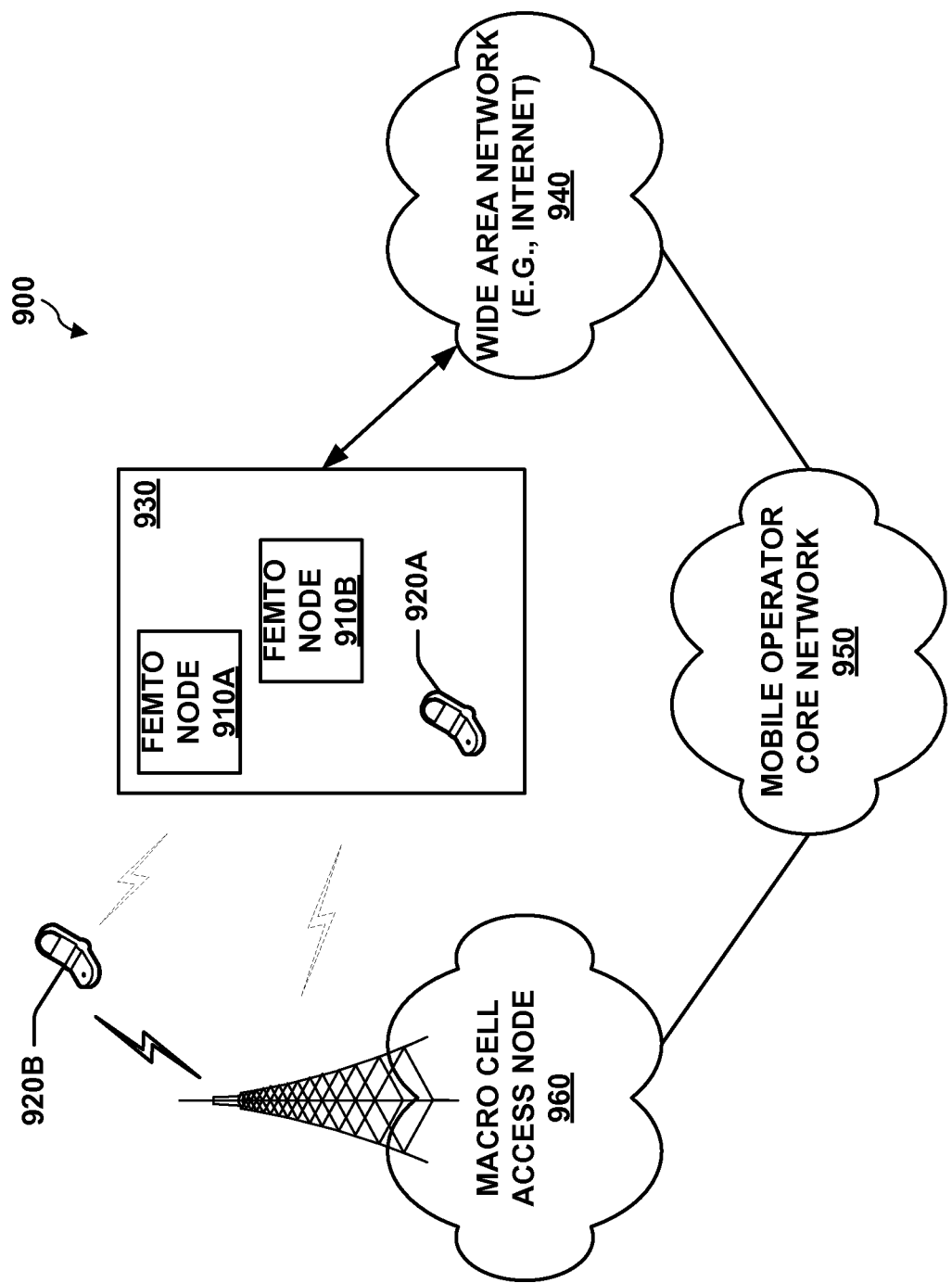
FIG. 9 is an illustration of an exemplary communication system to enable deployment of femtocells within a network environment.

FIG. 9 illustrates an exemplary communication system 900 where one or more femto nodes, such as femto node 202 of FIG. 2, are deployed within a network environment. Specifically, the system 900 includes multiple femto nodes 910A and 910B (e.g., femtocell nodes or H(e)NB) installed in a relatively small scale network environment (e.g., in one or more user residences 930), which, in one aspect, may correspond to femto nodes 104, 106, 108, 110, and 112 of FIG. 1. Each femto node 910 can be coupled to a wide area network 940 (e.g., the Internet) and a mobile operator core network 950 via a digital subscriber line (DSL) router, a cable modem, a wireless link, or other connectivity means (not shown). As will be discussed below, each femto node 910 can be configured to serve associated mobile devices 920 (e.g., mobile device 920A) and, optionally, alien mobile devices 920 (e.g., mobile device 920B). In other words, access to femto nodes 910 can be restricted such that a given mobile device 920 can be served by a set of designated (e.g., home) femto node(s) 910 but may not be served by any non-designated femto nodes 910 (e.g., a neighbor's femto node).

Figure 10:
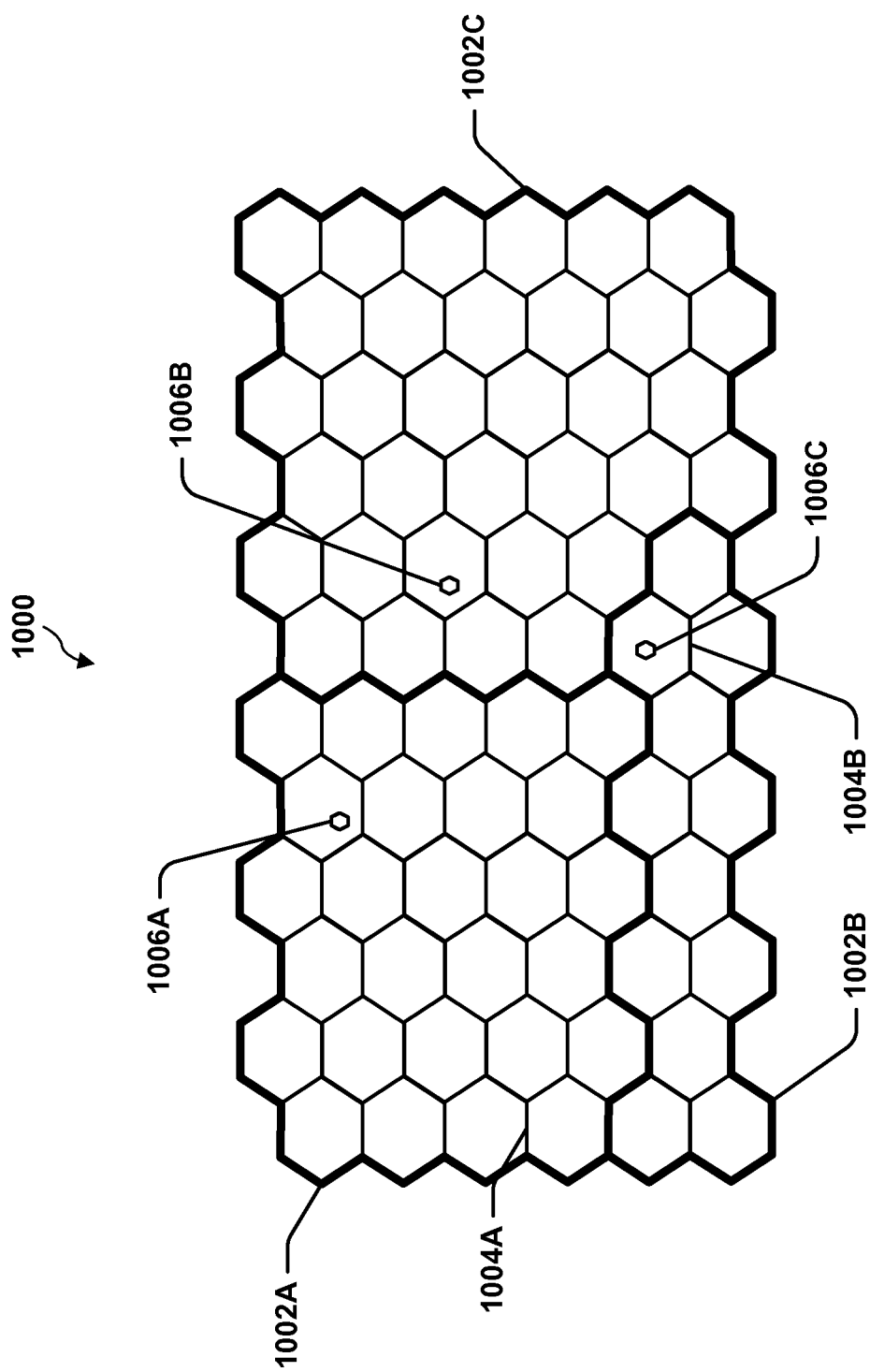
FIG. 10 illustrates an example of a coverage map having several defined tracking areas.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the hexagons. The tracking areas 1002 also include femto coverage areas 1006 corresponding to respective femto nodes, such as a femto node 202 of FIG. 2, and which may include the components and implement the functions described above with respect to FIGS. 1-5. In this example, each of the femto coverage areas 1006 (e.g., femto coverage area 1006C) is depicted within a macro coverage area 1004 (e.g., macro coverage area 1004B). It should be appreciated, however, that a femto coverage area 1006 may not lie entirely within a macro coverage area 1004. In practice, a large number of femto coverage areas 1006 can be defined with a given tracking area 1002 or macro coverage area 1004. Also, one or more pico coverage areas (not shown) can be defined within a given tracking area 1002 or macro coverage area 1004.

Referring again to FIG. 9, the owner of a femto node 910 can subscribe to mobile service, such as, for example, 3G mobile service, offered through the mobile operator core network 950. In another example, the femto node 910 can be operated by the mobile operator core network 950 to expand coverage of the wireless network. In addition, a mobile device 920 can be capable of operating both in macro environments and in smaller scale (e.g., residential) network environments. Thus, for example, depending on the current location of the mobile device 920, the mobile device 920 can be served by a macro cell access node 960 or by any one of a set of femto nodes 910 (e.g., the femto nodes 910A and 910B that reside within a corresponding user residence 930). For example, when a subscriber is outside his home, he is served by a standard macro cell access node (e.g., node 960) and when the subscriber is at home, he is served by a femto node (e.g., node 910A). Here, it should be appreciated that a femto node 910 can be backward compatible with existing mobile devices 920.

A femto node 910 can be deployed on a single frequency or, in the alternative, on multiple frequencies. Depending on the particular configuration, the single frequency or one or more of the multiple frequencies can overlap with one or more frequencies used by a macro cell access node (e.g., node 960). In some aspects, an mobile device 920 can be configured to connect to a preferred femto node (e.g., the home femto node of the mobile device 920) whenever such connectivity is possible. For example, whenever the mobile device 920 is within the user's residence 930, it can communicate with the home femto node 910.

In some aspects, if the mobile device 920 operates within the mobile operator core network 950 but is not residing on its most preferred network (e.g., as defined in a preferred roaming list), the mobile device 920 can continue to search for the most preferred network (e.g., femto node 910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the mobile device 920 can limit the search for specific band and channel. For example, the search for the most preferred system can be repeated periodically. Upon discovery of a preferred femto node, such as femto node 910, the mobile device 920 selects the femto node 910 for camping within its coverage area.

A femto node can be restricted in some aspects. For example, a given femto node can only provide certain services to certain mobile devices. In deployments with so-called restricted (or closed) association, a given mobile device can only be served by the macro cell mobile network and a defined set of femto nodes (e.g., the femto nodes 910 that reside within the corresponding user residence 930). In some implementations, a femto node can be restricted to not provide, for at least one mobile device, at least one of: signaling, data access, registration, paging, or service.

In some aspects, a restricted femto node (which can also be referred to as a Closed Subscriber Group H(e)NB) is one that provides service to a restricted provisioned set of mobile devices. This set can be temporarily or permanently extended as necessary. In some aspects, a Closed Subscriber Group (CSG) can be defined as the set of access nodes (e.g., femto nodes) that share a common access control list of mobile devices. A channel on which all femto nodes (or all restricted femto nodes) in a region operate can be referred to as a femto channel.

Various relationships can thus exist between a given femto node and a given mobile device. For example, from the perspective of a mobile device, an open femto node can refer to a femto node with no restricted association. A restricted femto node can refer to a femto node that is restricted in some manner (e.g., restricted for association and/or registration). A home femto node can refer to a femto node on which the mobile device is authorized to access and operate on. A guest femto node can refer to a femto node on which a mobile device is temporarily authorized to access or operate on. An alien femto node can refer to a femto node on which the mobile device is not authorized to access or operate on, except for perhaps emergency situations (e.g., 911 calls).

From a restricted femto node perspective, a home mobile device can refer to an mobile device that authorized to access the restricted femto node. A guest mobile device can refer to a mobile device with temporary access to the restricted femto node. An alien mobile device can refer to a mobile device that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given mobile device, and so on.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for wireless communication, comprising:
   receiving, by a femtocell, location measurement information and a performance measurement report from a mobile device, wherein the location measurement information includes at least two different types of location measurements;
   applying different weighting coefficients to the at least two different types of location measurements based on measurement values of the at least two different types of location measurements;
   determining, based at least in part on the different weighting coefficients as applied to the at least two different types of location measurements, whether the mobile device is located indoors or outdoors; and
   adjusting at least a coverage area of the femtocell based on whether the mobile device is located indoors or outdoors and based on the performance measurement report of the mobile device.

2. The method of claim 1, further comprising: selecting one or more of a transmit power and radio frequency (RF) channel or band for the femtocell based on whether the mobile device is located indoors or outdoors and based on performance measurement report of the mobile device.

3. The method of claim 1, wherein the location measurement information includes acoustical measurements of the mobile device.

4. The method of claim 1, wherein the location measurement information includes optical measurements of the mobile device.

5. The method of claim 1, wherein the location measurement information includes GPS measurements of the mobile device.

6. The method of claim 1, wherein the location measurement information includes one or more of altimeter and barometer measurements of the mobile device.

7. The method of claim 1, wherein the location measurement information includes one or more of accelerometer and gyroscope measurements of the mobile device.

8. The method of claim 1, wherein the location measurement information includes RF channel measurements of the mobile device.

9. The method of claim 1, wherein the location measurement information includes location history information of the mobile device.

10. The method of claim 1, wherein the performance measurement report includes one or more of a received signal strength indicator (RSSI), the number of cell reselections, number and type of handovers, number of call drops, average uplink and downlink interference, and statistics of wireless services used by the mobile device.

11. An apparatus for wireless communication, comprising:
a memory; and
at least one processor coupled to the memory, wherein the at least one processor is configured to:
receive location measurement information and a performance measurement report from a mobile device, wherein the location measurement information includes at least two different types of location measurements;
apply different weighting coefficients to the at least two different types of location measurements based on measurement values of the at least two different types of location measurements;
determine, based at least in part on the different weighting coefficients as applied to the at least two different types of location measurements, whether the mobile device is located indoors or outdoors; and
adjust at least a coverage area of a femtocell based on whether the mobile device is located indoors or outdoors and based on the performance measurement report of the mobile device.

12. The apparatus of claim 11, wherein the at least one processor is further configured to select one or more of a transmit power and radio frequency (RF) channel or band for the femtocell based on whether the mobile device is located indoors or outdoors and based on performance measurement report of the mobile device.

13. The apparatus of claim 11, wherein the location measurement information includes one or more of an acoustical measurement, optical measurement, GPS measurement, altimeter measurement, barometer measurement, accelerometer measurement, gyroscope measurement, RF channel measurement, and location history information of the mobile device.

14. The apparatus of claim 11, wherein the performance measurement report includes one or more of a received signal strength indicator (RSSI), the number of cell reselections, number and type of handovers, number of call drops, average uplink and downlink interference, and statistics of wireless services used by the mobile device.

15. A femtocell apparatus for wireless communication, comprising:
means for receiving location measurement information and a performance measurement report from a mobile device, wherein the location measurement information includes at least two different types of location measurements;
means for applying different weighting coefficients to the at least two different types of location measurements based on measurement values of the at least two different types of location measurements;
means for determining, based at least in part on the different weighting coefficients as applied to the at least two different types of location measurements, whether the mobile device is located indoors or outdoors; and
means for adjusting at least a coverage area of the femtocell based on whether the mobile device is located indoors or outdoors and based on the performance measurement report of the mobile device.

16. The apparatus of claim 15, further comprising means for selecting one or more of a transmit power and radio frequency (RF) channel or band for the femtocell based on whether the mobile device is located indoors or outdoors and based on performance measurement report of the mobile device.

17. The apparatus of claim 15, wherein the location measurement information includes one or more of an acoustical measurement, optical measurement, GPS measurement, altimeter measurement, barometer measurement, accelerometer measurement, gyroscope measurement, RF channel measurement, and location history information of the mobile device.

18. The apparatus of claim 15, wherein the performance measurement report includes one or more of a received signal strength indicator (RSSI), the number of cell reselections, number and type of handovers, number of call drops, average uplink and downlink interference, and statistics of wireless services used by the mobile device.

19. A non-transitory computer-readable medium storing computer-executable code, comprising:
code for causing at least one computer to receive location measurement information and a performance measurement report from a mobile device, wherein the location measurement information includes at least two different types of location measurements;
code for applying different weighting coefficients to the at least two different types of location measurements based on measurement values of the at least two different types of location measurements;
code for causing the at least one computer to determine, based at least in part on the different weighting coefficients as applied to the at least two different types of location measurements, whether the mobile device is located indoors or outdoors; and
code for causing the at least one computer to adjust at least a coverage area of a femtocell based on whether the mobile device is located indoors or outdoors and based on the performance measurement report of the mobile device.

20. The non-transitory computer-readable medium of claim 19, further comprising code for causing the at least one computer to select one or more of a transmit power and radio frequency (RF) channel or band for the femtocell based on whether the mobile device is located indoors or outdoors and based on performance measurement report of the mobile device.

21. The non-transitory computer-readable medium of claim 19, wherein the location measurement information includes one or more of an acoustical measurement, optical measurement, GPS measurement, altimeter measurement, barometer measurement, accelerometer measurement, gyroscope measurement, RF channel measurement, and location history information of the mobile device.

22. The non-transitory computer-readable medium of claim 19, wherein the performance measurement report includes one or more of a received signal strength indicator (RSSI), the number of cell reselections, number and type of handovers, number of call drops, average uplink and downlink interference, and statistics of wireless services used by the mobile device.

23. A method for wireless communication, comprising:

performing a plurality of location measurements by a mobile device, wherein the plurality of location measurements include at least two different types of location measurements;

applying different weighting coefficients to the at least two different types of location measurements based on measurement values of the at least two different types of location measurements;

determining, based at least in part on the different weighting coefficients as applied to the at least two different types of location measurements, whether the mobile device is located indoors or outdoors;

collecting one or more performance measurements by the mobile device; and sending location classification information, indicating whether the mobile device is located indoors or outdoors, and a performance measurement report, containing the one or more performance measurements, to a femtocell.

24. The method of claim 23, wherein the location measurements include one or more of an acoustical measurement, optical measurement, GPS measurement, altimeter measurement, barometer measurement, accelerometer measurement, gyroscope measurement, and RF channel measurement.

25. The method of claim 23, wherein the performance measurements include one or more of a received signal strength indicator (RSSI), the number of cell reselections, number and type of handovers, number of call drops, average uplink and downlink interference, and statistics of wireless services used by the mobile device.

26. An apparatus for wireless communication, comprising:

a memory; and at least one processor coupled to the memory, wherein the at least one processor is configured to:

perform a plurality of location measurements and performance measurements of the mobile device, wherein the plurality of location measurements include at least two different types of location measurements;

apply different weighting coefficients to the at least two different types of location measurements based on measurement values of the at least two different types of location measurements;

determine, based at least in part on the different weighting coefficients as applied to the at least two different types of location measurements, whether the mobile device is located indoors or outdoors;

collect one or more performance measurements by the mobile device; and send location classification information, indicating whether the mobile device is located indoors or outdoors, and a performance measurement report, containing the one or more performance measurements, to a femtocell.

27. The apparatus of claim 26, wherein the location measurements include one or more of an acoustical measurement, optical measurement, GPS measurement, altimeter measurement, barometer measurement, accelerometer measurement, gyroscope measurement, and RF channel measurement.

28. The apparatus of claim 26, wherein the performance measurements include one or more of a received signal strength indicator (RSSI), the number of cell reselections, number and type of handovers, number of call drops, average uplink and downlink interference, and statistics of wireless services used by the mobile device.

29. An apparatus for wireless communication, comprising:

means for performing a plurality of location measurements by a mobile device, wherein the plurality of location measurements include at least two different types of location measurements;

means for applying different weighting coefficients to the at least two different types of location measurements based on measurement values of the at least two different types of location measurements;

means for determining, based at least in part on the different weighting coefficients as applied to the at least two different types of location measurements, whether the mobile device is located indoors or outdoors;

means for collecting one or more performance measurements by the mobile device; and means for sending location classification information, indicating whether the mobile device is located indoors or outdoors, and a performance measurement report, containing the one or more performance measurements, to a femtocell.

30. The apparatus of claim 29, wherein the location measurements include one or more of an acoustical measurement, optical measurement, GPS measurement, altimeter measurement, barometer measurement, accelerometer measurement, gyroscope measurement, and RF channel measurement.

31. The apparatus of claim 29, wherein the performance measurements include one or more of a received signal strength indicator (RSSI), the number of cell reselections, number and type of handovers, number of call drops, average uplink and downlink interference, and statistics of wireless services used by the mobile device.

32. A non-transitory computer-readable medium storing computer-executable code, comprising:

code for causing at least one computer to perform a plurality of location measurements by a mobile device, wherein the plurality of location measurements include at least two different types of location measurements;

code for applying different weighting coefficients to the at least two different types of location measurements based on measurement values of the at least two different types of location measurements;

code for causing the at least one computer to determine, based at least in part on the different weighting coefficients as applied to the at least two different types of location measurements, whether the mobile device is located indoors or outdoors;

code for causing the at least one computer to collect one or more performance measurements by the mobile device; and code for causing the at least one computer to send location classification information, indicating whether the mobile device is located indoors or outdoors, and a performance measurement report, containing the one or more performance measurements, to a femtocell.

33. The non-transitory computer-readable medium of claim 32, wherein the location measurements include one or more of an acoustical measurement, optical measurement, GPS measurement, altimeter measurement, barometer measurement, accelerometer measurement, gyroscope measurement, and RF channel measurement.

34. The non-transitory computer-readable medium of claim 32, wherein the performance measurements include one or more of a received signal strength indicator (RSSI), the number of cell reselections, number and type of handovers, number of call drops, average uplink and downlink interference, and statistics of wireless services used by the mobile device.

\* \* \* \* \*